United States Patent
Edenfeld

(10) Patent No.: US 8,294,289 B2
(45) Date of Patent: Oct. 23, 2012

(54) METHOD FOR OPERATING A WIND TURBINE, METHOD FOR DETERMINING THE TEMPERATURE OF A PERMANENT MAGNET AND CONTROLLER FOR A WIND TURBINE

(75) Inventor: Thomas Edenfeld, Osnabrück (DE)

(73) Assignee: General Electric Company, Schenectady, NY (US)

( * ) Notice: Subject to any disclaimer, the term of this patent is extended or adjusted under 35 U.S.C. 154(b) by 152 days.

(21) Appl. No.: 12/827,351

(22) Filed: Jun. 30, 2010

(65) Prior Publication Data

US 2011/0140424 A1    Jun. 16, 2011

(51) Int. Cl.
*F03D 9/00* (2006.01)
*H02P 9/04* (2006.01)

(52) U.S. Cl. .......................................... 290/44; 322/44
(58) Field of Classification Search .................... 290/44, 290/55; 322/44; 700/287, 286
See application file for complete search history.

(56) References Cited

U.S. PATENT DOCUMENTS

| | | | | |
|---|---|---|---|---|
| 5,453,901 A * | 9/1995 | Lackey | ............................ | 361/21 |
| 8,013,459 B2 * | 9/2011 | Ito et al. | ........................... | 290/44 |
| 2007/0216165 A1 * | 9/2007 | Oohara et al. | ................... | 290/44 |
| 2008/0018112 A1 * | 1/2008 | Kleen | .......................... | 290/40 B |
| 2008/0157533 A1 * | 7/2008 | Flottemesch et al. | ........... | 290/55 |
| 2009/0206603 A1 * | 8/2009 | Llorente Gonzalez | ......... | 290/44 |
| 2009/0212564 A1 * | 8/2009 | Yang et al. | ...................... | 290/44 |
| 2009/0261589 A1 * | 10/2009 | Oohara et al. | ................... | 290/44 |
| 2010/0123314 A1 * | 5/2010 | Menke | ............................ | 290/44 |
| 2010/0213712 A1 * | 8/2010 | Arinaga et al. | ................. | 290/44 |
| 2010/0283266 A1 * | 11/2010 | Shafiq et al. | ................ | 290/36 R |
| 2010/0327599 A1 * | 12/2010 | Nielsen et al. | ................... | 290/55 |

* cited by examiner

*Primary Examiner* — Julio Gonzalez
(74) *Attorney, Agent, or Firm* — Global Patent Operation; Douglas D. Zhang

(57) ABSTRACT

The disclosure concerns a method for operating a wind turbine having an electrical system, the electrical system comprises a permanent magnet generator having a rotor and a stator, and a power electronic device electrically connected to the permanent magnet generator, wherein the power electronic device and a circuit breaker are electrically disposed in series between the permanent magnet generator and a grid, wherein the permanent magnet generator has permanent magnets and a generator winding into which a voltage is induced by the permanent magnets when the rotor is rotating, the method comprising: generating a signal for tripping the circuit breaker based on a field modification that is modifying the field of the permanent magnets of the permanent magnet generator. Further, the disclosure concerns a method for determining the temperature of at least one permanent magnet of a permanent magnet machine and a controller for a wind turbine.

20 Claims, 7 Drawing Sheets

METHOD FOR OPERATING A WIND TURBINE, METHOD FOR DETERMINING THE TEMPERATURE OF A PERMANENT MAGNET AND CONTROLLER FOR A WIND TURBINE

The present disclosure relates to a method for operating a wind turbine. Further, the disclosure relates to a method for determining the temperature of a permanent magnet of a permanent magnet generator. Additionally, the disclosure relates to a controller for a wind turbine and a wind turbine having such a controller.

BACKGROUND OF THE INVENTION

Wind turbines may use a permanent magnet generator instead of an electrically excited synchronous or asynchronous generator to improve the system efficiency, in particular at partial load, and, in some embodiments, the annual energy production (AEP) of the wind turbine is increased. Generators have in some embodiments one or more stator windings, in which a rotating magnetic field of the magnets, in particular the permanent magnets, induce a voltage. The induced voltage is proportional to the rotational speed of a rotor of the generator and also proportional to the field of the permanent magnets.

In typical embodiments, the magnetization of the magnets used in a permanent magnet generator is temperature dependent. In particular, the magnetization of the permanent magnets decreases when the temperature increases. Due to the higher magnetization at lower temperatures, a higher voltage is induced in windings of a power generator at lower temperatures than at higher temperatures.

In typical usage, the generator of a wind turbine is electrically connected to a grid or to inverters, such that the output voltage of the generator is approximately constant. Typically, the inverter or other equipment, for example a circuit breaker or a transformer, is usually rated to a maximum current or voltage. Typically, wind turbines are started at low ambient temperatures with a low rotor speed, such that the induced voltage into the stator windings is not high enough to destroy the equipment of the wind turbine.

BRIEF DESCRIPTION OF THE INVENTION

In view of the above, a method for operating a wind turbine having an electrical system, the electrical system includes a permanent magnet generator having a rotor and a stator, and a power electronic device electrically connected to the permanent magnet generator, wherein the power electronic device and a circuit breaker are electrically disposed in series between the permanent magnet generator and a grid, wherein the permanent magnet generator has permanent magnets and a generator winding into which a voltage is induced by the permanent magnets when the rotor is rotating is provided. The method comprising: generating a signal for tripping the circuit breaker based on a field modification that is modifying the field of the permanent magnets of the permanent magnet generator.

According to a further aspect, a method for determining the temperature of at least one permanent magnet of a permanent magnet machine having a rotor and a stator is provided, wherein the permanent magnet machine has at least one permanent magnet and a machine winding into which a voltage is induced by the at least one permanent magnet when the rotor is rotated. The method comprises: determining the temperature of the at least one permanent magnet of the permanent magnet machine on the basis of a rotational dynamic of the rotor and a field modification that is modifying the field of the at least one permanent magnet of the permanent magnet machine.

According to a further aspect, a controller for a wind turbine is provided, the wind turbine comprising an electrical system having a permanent magnet generator having a rotor and a stator, and a power electronic device operatively connected to the permanent magnet generator, and a circuit breaker electrically disposed in series between the permanent magnet generator, wherein the permanent magnet generator has permanent magnets and a generator winding into which a voltage is induced by the permanent magnets when the rotor is rotating, wherein the controller is further adapted to be connected to a control circuit of the circuit breaker, wherein the controller is adapted to generate a signal for tripping the circuit breaker based on a field modification of the magnetic field of the permanent magnets of the permanent magnet generator.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Figure 1:
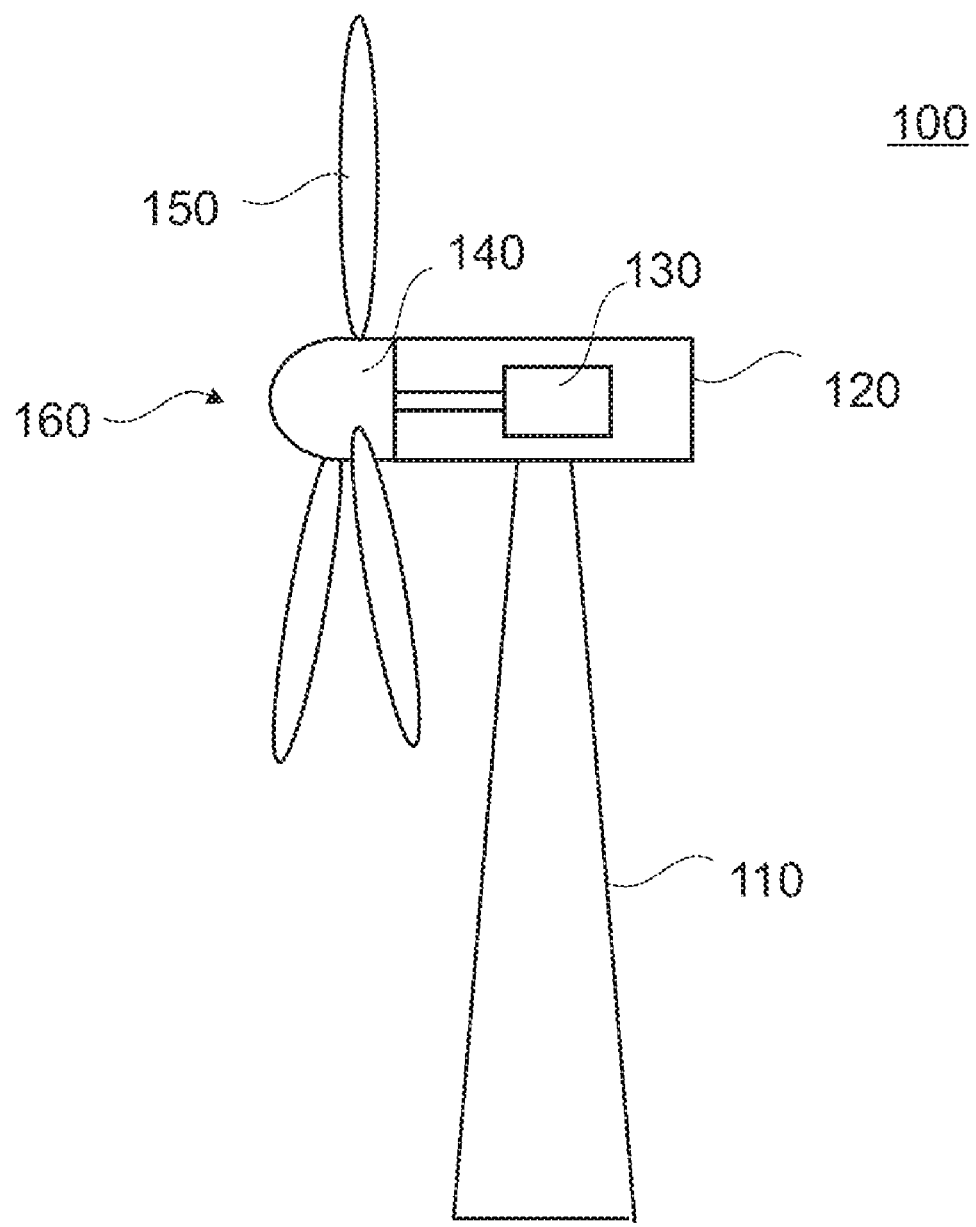
FIG. 1 shows a schematical drawing of a wind turbine.

FIG. 1 shows a wind turbine 100. The wind turbine 100 includes a tower 110 on which a nacelle 120 is mounted. The nacelle 120 is rotatable about a vertical axis of the tower. Within the nacelle 120 a generator 130 for transforming rotational energy into electrical energy is placed. The generator is mechanically connected to a hub 140 that is rotatable about a horizontal axis. Three rotor blades 150 are connected to the hub 140. The rotor blades 150 and the hub 140 together form a wind rotor 160 of the wind turbine 100. The wind turbine 100 operates as follows. In a typical situation, the nacelle 120 is rotated about the vertical axis such that the horizontal axis of the hub 140 is substantially parallel to a wind direction. The wind exerts a torque on the wind rotor 160 due to an aerodynamical profile of the rotor blades 150. Accordingly, the wind rotor is rotating about its horizontal axis, thus driving the generator. The generator 130 transforms the mechanical rotation into an electric current. Hence, the kinetic energy of the wind is transformed into electric energy.

Figure 2:
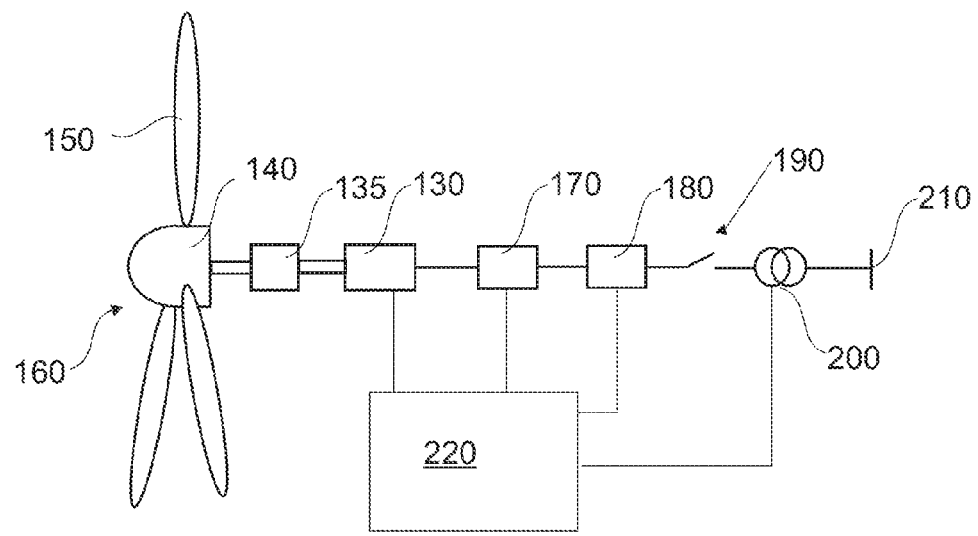
FIG. 2 shows an embodiment of an electrical system of a wind turbine.

FIG. 2 shows an embodiment of an electrical system of a wind turbine. In a typical embodiment the electrical system includes one or more components for converting mechanical energy into electrical power and also one or more supervisory systems. FIG. 2 shows on the left side the hub 140 and the rotor blades 150 connected to the hub 140, wherein the rotor blades 150 and the hub 140 are forming the wind rotor 160. The hub 140 is mechanically connected to the generator 130 for rotating the rotor of the generator. In a typical embodiment, a gear box 135 is arranged between the wind rotor 160 and the rotor of the generator 130, for converting a first rotational speed of the wind rotor 160 to a second rotational speed that is applied to the rotor of the generator 130. In other embodiments, a gear-less wind turbine may be provided. Then, no gear box is provided between the wind rotor 160 and the rotor of the generator 130, in other words the wind rotor 160 is directly connected to the rotor of the generator 130. In a typical embodiment, the output currents of the generator are connected to a commutator 170 that converts an alternating current, in particular a three phase alternating current, generated by the generator 130, to a direct current. The direct current is than transformed by an inverter 180 to a three phase alternating current.

The output of the inverter 180 is electrically connected via a circuit breaker 190 and a transformer 200 to a medium or high voltage grid 210.

In a typical embodiment, which may be combined with other embodiments herein, the commutator 170 and/or the inverter 180 may include power electronic devices, for example IGBTs. Typically, the power electronic devices can only withstand high voltage currents or voltages to a specific limit.

Thus, in a typical embodiment, the generator, the commutator, the inverter, the circuit breaker and the transformer are electrically connected in series. In further embodiments, the commutator and/or the transformer are not compulsory.

In a further embodiment, a control device 220 is connected to the generator, the commutator 170 and the inverter 180, the circuit breaker 190 and its transformer 200. In another embodiment, each electronic device for converting or switching the generated currents may have its own control device.

In a further embodiment, the generator 130 is directly connected to the inverter 180, which in turn is connected via the circuit breaker 190 and the transformer 200 to the grid 210.

Figure 3:
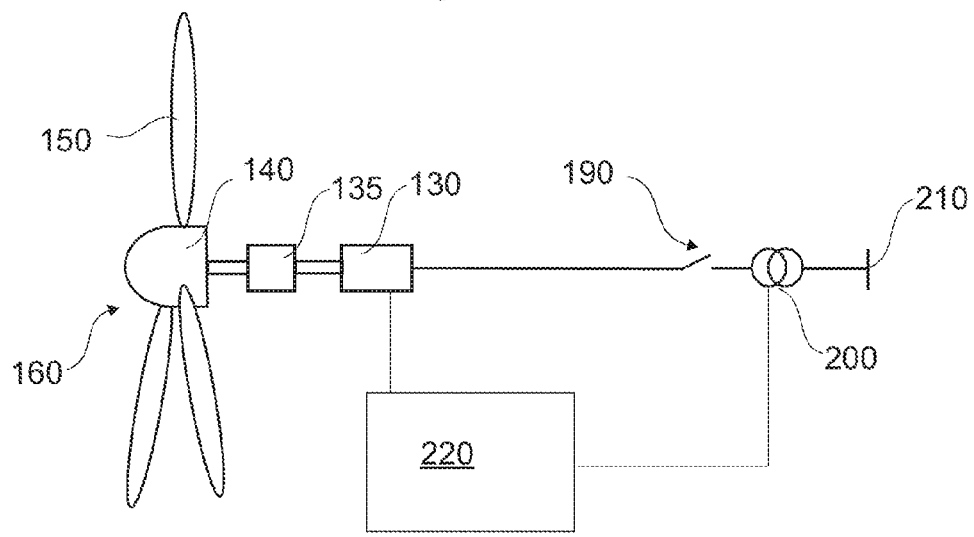
FIG. 3 shows a further embodiment of an electrical system of a wind turbine.

FIG. 3 shows a further embodiment of an electric system of a wind turbine. In the electric system shown in FIG. 3, the output of the generator 130 is electrically connected to the circuit breaker 190, which in turn is connected to the transformer 200. The transformer 200 is then connected to the grid 210. Typically, in an embodiment, the generator, the inverter, the circuit breaker and the transformer are electrically connected in series. According to a further embodiment, a control device 220 is adapted to control the generator 130, the circuit breaker 190 and the transformer 200.

In other embodiments, the electric system of a wind turbine may include more than one control device, wherein the control devices are assigned to a specific electric device. In such an embodiment, the control devices may typically communicate with each other.

The generator 130 is typically a permanent magnet generator. For example, this may be a three phase permanent magnet generator. In a typical embodiment, the generator may be a smooth core or a salient pole electrical machine.

Figure 4:
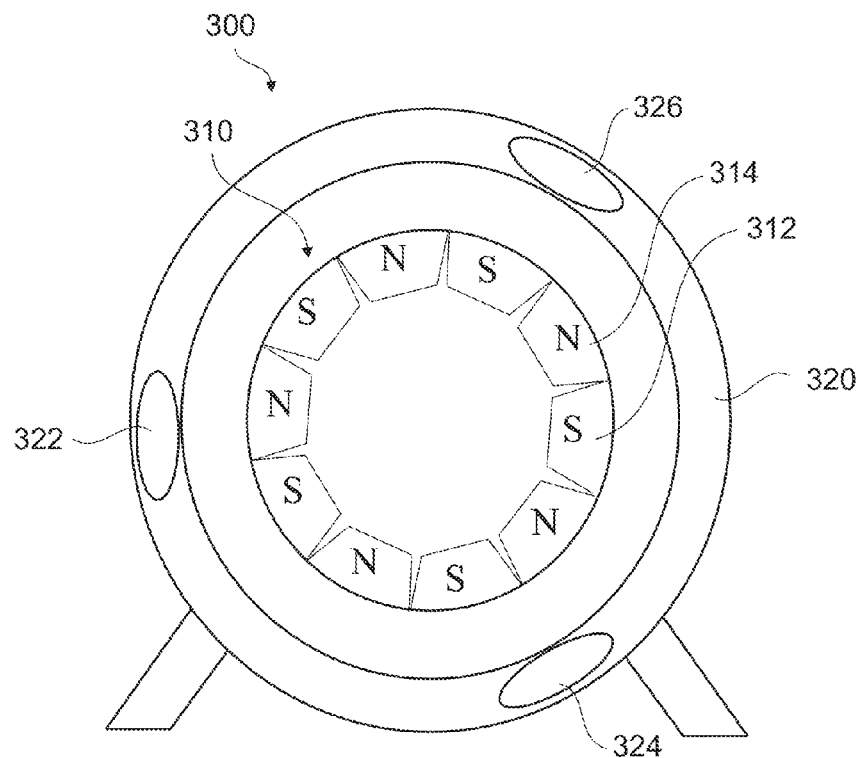
FIG. 4 shows an embodiment of a generator.

FIG. 4 shows schematic drawing of an embodiment of a three phase permanent magnet generator with a smooth core. The generator 300 includes a rotor 310 and a stator 320. The rotor 310 is mechanically connected to the wind rotor 160, in a typical embodiment via a gear box. In other embodiments, the wind rotor 160 is directly connected to the rotor of the generator 130. Then, no gear box is provided between the wind rotor 160 and the rotor of the generator 130, in other words. Thus, when the wind rotor is rotated by the kinetic energy of the wind, the wind rotor drives the rotor 310 of the generator that in turn rotates. The rotor 310 includes at least two permanent magnets 312, 314 wherein the north poles 314 and south poles 312 are alternately arranged on the circumference of the rotor 310. In a further embodiment, the rotor 310 may include more than two permanent magnets.

The stator includes in a typical embodiment three windings 322, 324, 326, wherein each phase of a three phase current is connected to a respective winding. In further embodiments, the generator 300 may include more windings, for example two or more windings for each phase. When the rotor 310 is rotating, it generates a rotating magnetic field. According to the induction law, a voltage is induced in the windings 322, 324, 326 of the stator. The induced voltage is proportional to the rotational speed of a rotor of the generator and also proportional to the field of the permanent magnets. The windings 322, 324, 326 of the stator may be, for example, connected to a circuit breaker, a commutator, or an inverter, as shown in FIGS. 2 and 3.

Figure 5:
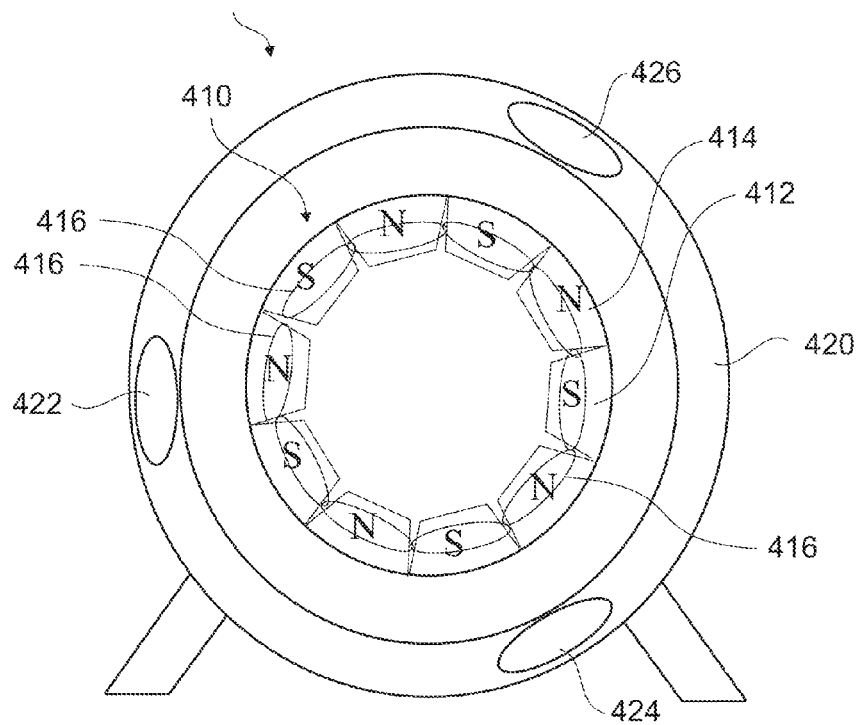
FIG. 5 shows a further embodiment of a generator.

FIG. 5 shows a further embodiment of a generator 400. The same features used in FIG. 4 for the generator 400 have the same reference numbers as for the generator shown in FIG. 3 increased by 100. Thus, also FIG. 5 shows a permanent magnet generator. The permanent magnets 412, 414 are disposed on the rotor 410. In addition to the generator shown in FIG. 4, the generator 400 has a rotor 410 which includes further excitation windings 416 for providing an excitation magnetic field. In a typical embodiment, excitation magnetic fields are used for weakening the magnetic fields of the permanent magnets 412, 422. In an embodiment, the magnetic fields of the excitation windings 416 are adapted to provide a magnetic field in opposite direction of the permanent magnets 412, 422.

In a further embodiment, the rotor of the generator may be disposed outside the stator. In another embodiment, the stator may include the permanent magnets for generating a magnetic field, and the rotor may include the at least one winding into which the voltage is induced. The arrangement of the stator and the rotor and the permanent magnets may depend for example on the type of the wind turbine, the size of the nacelle.

Figure 6:
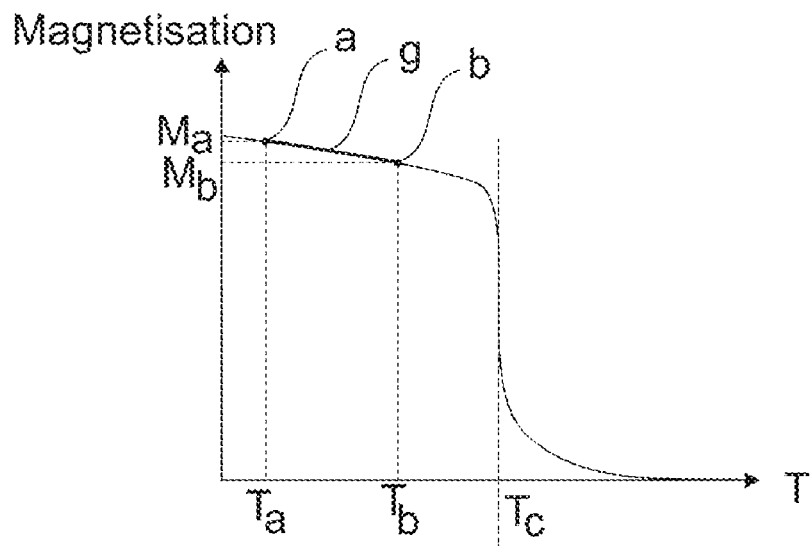
FIG. 6 shows a magnetization curve of a permanent magnet.

The magnets that are typically used in permanent magnet generators have a temperature dependent magnetization curve. In typical embodiments, permanent magnets may include rare earth metals and some of their alloys. If the temperature of a permanent magnet rises, the magnetization decreases until the Curie temperature $T_c$ above which the permanent magnet looses its magnetic characteristics. Thus, below the Curie temperature $T_c$, if the temperature decreases, the magnetization of the permanent magnet increases. Typically, permanent magnets including rare earth materials have a relative low Curie temperature. In a typical embodiment the permanent magnets that are normally used in permanent magnet generators have a temperature dependent magnetization curve that changes by approximately 1% per 10 K temperature increase. Higher temperatures reduce the magnetization of the magnets and lower temperatures increase the magnetization. For example, with a temperature change of about 30 degree Kelvin or Celcius, the magnetization changes by about 3%. FIG. 6 shows schematically a magnetization curve of a permanent magnet. In a first section of the curve, the magnetization of the permanent magnet decreases slowly, approximately constant, when the temperature increases. When the Curie temperature $T_c$ is reached, the permanent magnet looses substantially all of its magnetization. The magnetic flux $\Psi_{PM}$ of a permanent magnet is typically proportional to the magnetization of the permanent magnet.

As the induced voltages into the windings of the generator depend on the magnetization, in particular proportionally to the magnetization, the temperature of the magnets in a wind turbine may be monitored. In particular, when the load is disconnected from the generator, the induced voltage is applied to the power electronic devices, for example an inverter or a commutator, or to a circuit breaker of the wind turbine. These power electronic devices are, in a typical embodiment, rated for specific current or voltage. In the event that the voltage applied to the devices exceeds the rated voltage, the device may be destroyed.

In the substantial linear section A of the magnetization curve the temperature of the magnets may be determined based on a known magnetization. For example, the gradient of the magnetization curve of the substantial linear section A and a reference value of the substantial linear section A may be stored, for example the temperature $T_a$ and the magnetization $M_a$ of point a. In another embodiment, two reference values of the substantial linear section A may be stored, for deducing a gradient of the magnetization curve. Thus, if the magnetization is known, for example if a magnetization $M_b$ is measured, the temperature $T_b$ of point b may be deduced based on the known value of point a and the gradient g. Thus, the temperature of a permanent magnet may be measured based on the magnetization.

In a further embodiment, which may be combined with other embodiments disclosed herein, the complete magnetization curve may be stored in a look-up table, in which the temperature and the corresponding magnetization are stored.

Figure 7:
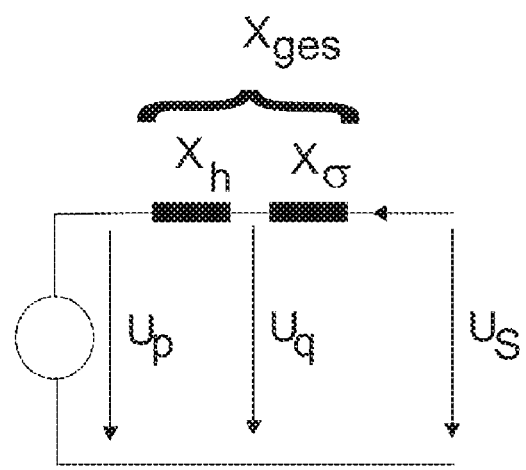
FIG. 7 shows an equivalent circuit of a generator.

FIG. 7 shows an equivalent circuit diagram for a synchronous generator. $U_p$ is the voltage induced by the magnetic flux $\Psi$ and therefore of the magnetic flux $\Psi_{PM}$ of the permanent magnets of the rotor of the generator. $U_p$ may also be called magnetic wheel voltage.

Typically, in synchronous generators, if a current $I_{ges}$ is flowing, the windings 322, 324, 326, 422, 424, 426 of the stator 320, 420 are also generating a magnetic field, which is rotating at the same speed as the rotor 310, 410 of the generator. This magnetic field is producing a rotating magnetic flux $\Psi_1$. As the magnetic flux $\Psi_1$ of the windings 322, 324, 326, 422, 424, 426 reduces the magnetic flux $\Psi_{PM}$ of the permanent magnet, the induced voltage is reduced. The reduced voltage is called $U_q$. Further, between the voltage $U_q$ and $U_S$ that is measured at the output of the generator, further, a phase spread reactance $X_{1\sigma}$ is disposed. The phase spread reactance $X_{1\sigma}$ and the main reactance $X_h$ form together a synchronous reactance $X_{ges}$, wherein $X_{ges}=X_h+X_{1\sigma}$.

Figure 8:
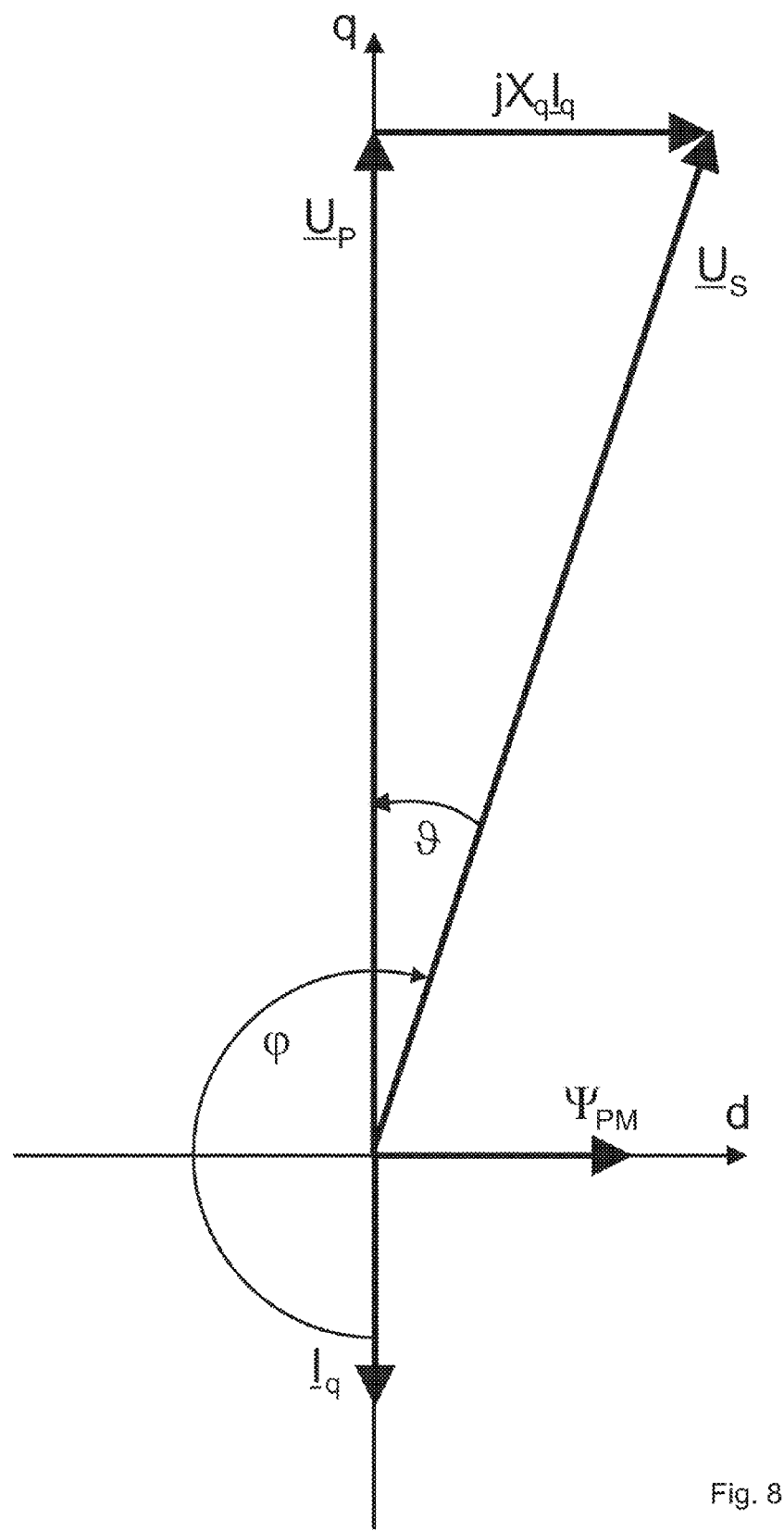
FIG. 8 shows a phasor diagram of a generator.

The currents and fields and voltages of a synchronous machine may be shown in a phasor diagram. Such a phasor diagram is shown in FIG. 8. In the phasor diagram the magnetic flux $\Psi_{PM}$ of the permanent magnets is shown. The magnetic flux induces the voltage $U_p$ into the windings of the generator in a single phase.

When the power generator is not connected to a network, the magnetic wheel voltage $U_p$ and the output voltage $U_S$ of the power generator are equal. The current and the voltage at the output of the generator $U_S$ is typically not allowed to exceed a specific value. For example, power electronic equipment may be destroyed if the value of the output current $U_S$ is greater than a certain value.

As already written above, the magnetization of the permanent magnets increases, when the temperature decreases. This leads to a higher magnet wheel voltage $U_p$ as the magnetic wheel voltage is proportional to the magnetic flux $\Psi_{PM}$ and therefore the magnetization of the permanent magnets. In such a case, in order to reach a nominal value for the output voltage $U_S$ of the generator, the field of the permanent magnets in the generator may be weakened.

In FIG. 8, the phasor diagram is shown in a complex plane with a coordinate system, which is typically called a dq0 system. The d-axis is called direct-axis and is parallel to the phasor of the magnetic flux of the permanent magnet, whereas the q-axis is called quadratur-axis and is orthogonal to the phasor of the magnetic flux $\Psi_{PM}$ of the permanent magnet and thus parallel to the magnet wheel voltage $U_p$. In FIG. 8, the phase current $I_{ges}$ has only an active current part $I_q$ in direction of the q-axis. Thus, $I_{ges}$ is in that case equal to $I_q$. Therefore, the tension dropping along the synchronous reactance $X_{ges}$, which is here equal to the tension dropping in direction of the d-axis, namely $jX_qI_q$, is parallel to the d-axis.

Figure 9:
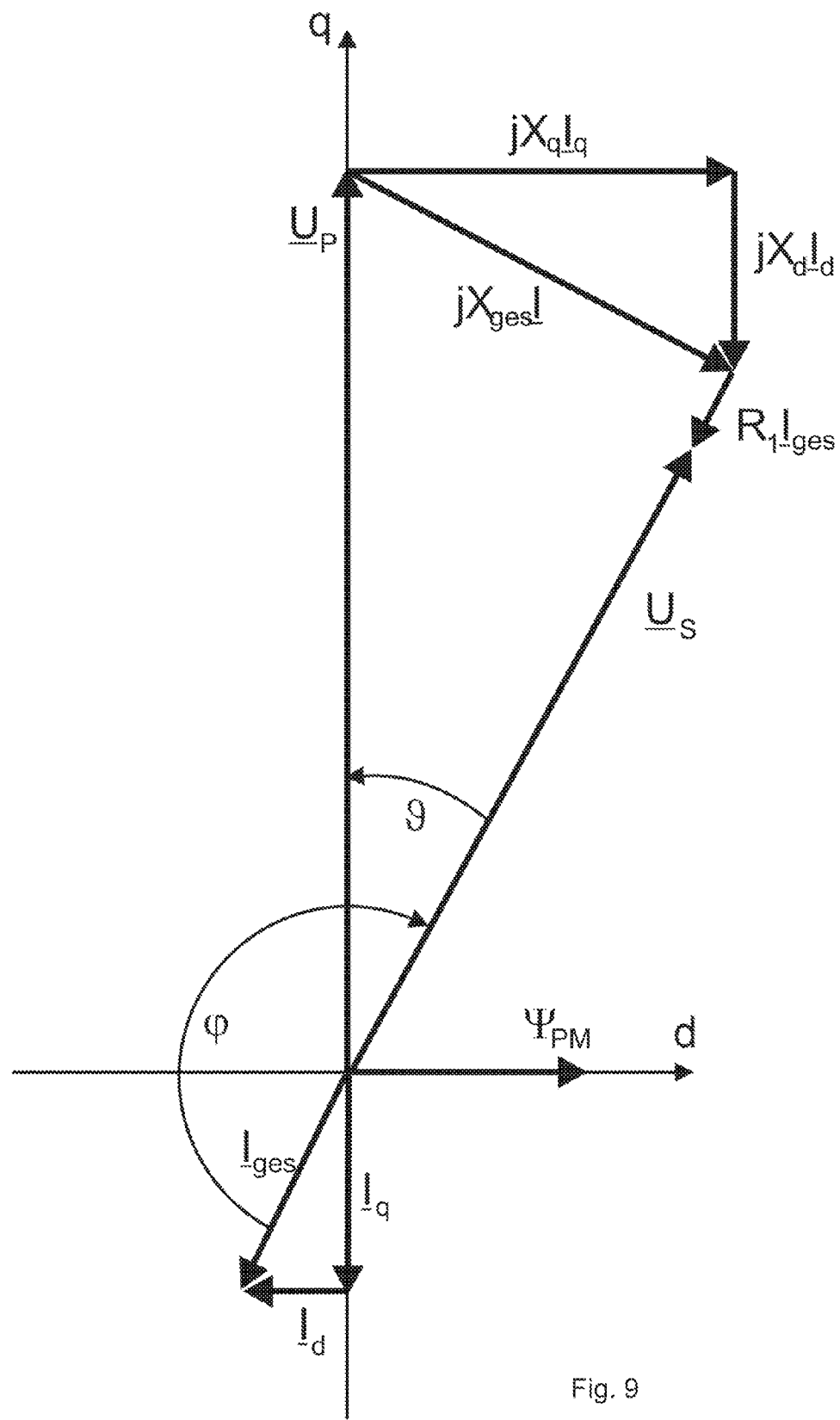
FIG. 9 shows a further phasor diagram of a generator.

In FIG. 9 is shown phasor diagram wherein the magnetic flux of the permanent magnets is weakened. The magnetic flux (not shown) generated by the current $I_{ges}$ has a part ($I_d$) going in the direction of the direct-axis, and a component ($I_q$) going in the direction of the quadratur-axis. The part of the magnetic flux in direction of the d-axis generated by the current $I_{ges}$ is proportional to the part $I_d$ of the current $I_{ges}$ going in the direction of the d-axis. Thus, the tension dropping along the synchronous reactance $X_{ges}$ has a part parallel to the d-axis ($jX_qI_q$), which is generated by the part of the current $I_q$ parallel to the q-axis, and a part parallel to the q-axis ($jX_dI_d$), which is generated by the part of the current $I_d$ parallel to the d-axis. This is the main part oft the current which provokes a weakening of the magnetic flux of the permanent magnet of the generator. Further, in FIG. 9 a tension dropping along a resistance $R_1$ is shown. The resistance $R_1$ is the phase resistance in the windings of the generator. Typically this resistance is very small with respect to the synchronous reactance, such that it may be omitted in the drawings and the calculation, as for example done with respect to FIG. 7 and FIG. 8. In a typical embodiment, the output voltage $U_S$ is constant. For example with respect to FIGS. 8 and 9, the phasors of $U_S$ would have the same length if drawn in the same coordinate system. Hence if the magnetic wheel voltage changes due to temperature changes, it is possible to adapt the (complex) current $I_{ges}$, having a part in direction of the d-axis and a part in direction of the q-axis, such that the output voltage remains constant. Thus, for example, with the current in the opposite direction of the d-axis the magnetic flux may be weakened.

In a further embodiment, at a stator the generator also includes excitation windings for generating a field in addition or in opposite direction to the field of the permanent magnets. Thus, the rotor generates a resulting magnetic flux of the permanent magnets $\Psi_M$ and the magnetic flux $\Psi_e$ of the excitation windings. Thus, for example if the temperatures are cold, the excitation field may be increased in opposite the direction to the magnetic field of the permanent magnets, such that the resulting magnetic field is smaller than the magnetic field of the permanent magnets.

As written above, the magnetic field or the magnetic flux of the permanent magnets increases when the temperature decreases. As the output voltage $U_S$ of the generator is fixed, or may be below a predetermined value, the field of the permanent magnets may be weakened, or the rotation speed of the rotor of the generator may be reduced, because the voltage $U_p$ is proportional to the magnetic flux of the stator and proportional to the rotational speed of the rotor. Thus, $U_p$ is proportional to the product of the magnetic flux of the stator and the rotational speed of the rotor.

Thus, using the information of the current in direction of the direct axis $I_{1d}$ and the rotational speed of the rotor of the generator, and in the case that the rotor includes an excitation winding, the current which is flowing in the excitation windings, the magnetic flux $\Psi_{PM}$ of the permanent magnets may be deduced, and thus the magnetization of the permanent magnets. As explained here-above, when using a reference value of the magnetization curve, the temperature of the permanent magnets may be deduced. Thus, in a typical embodiment, which may be combined with other embodiments disclosed herein, if the temperature of the permanent magnets comes close to the Curie temperature $T_c$, the wind turbine may be stopped.

Figure 10:
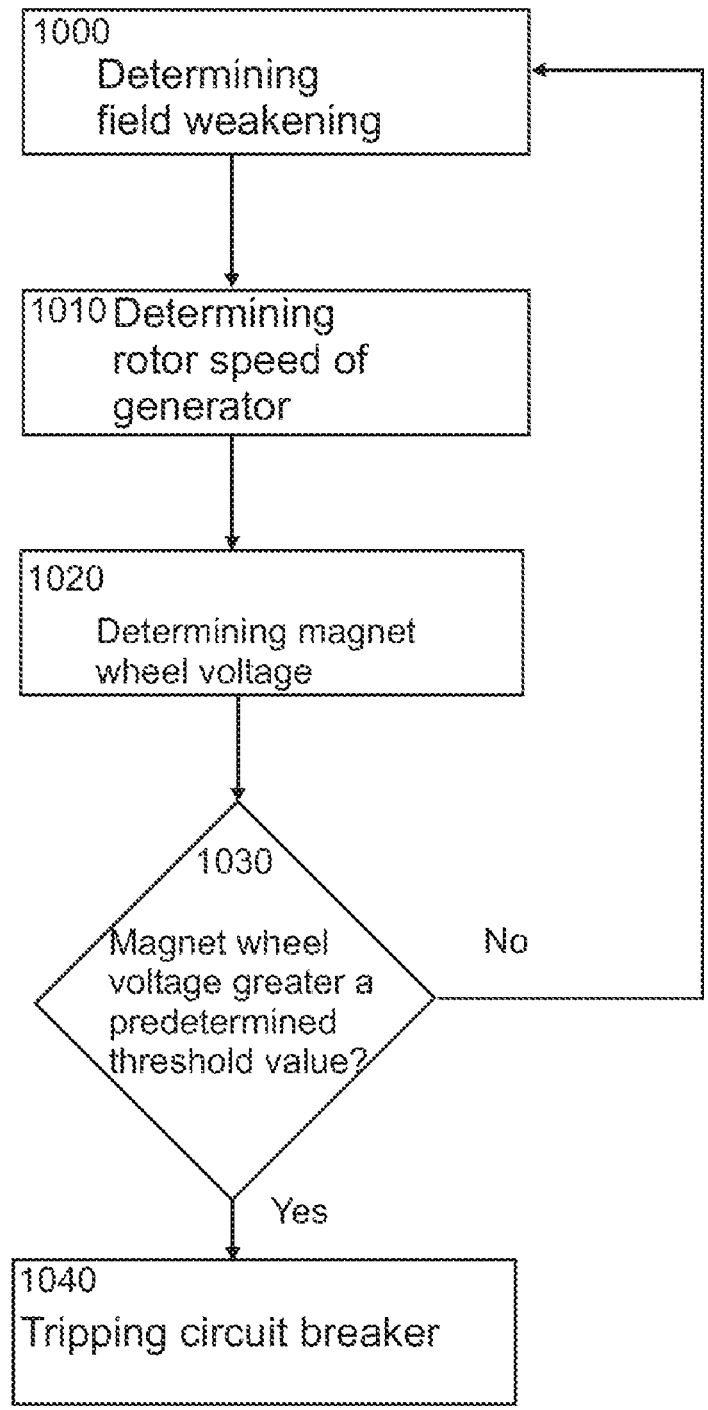
FIG. 10 shows a flow chart of an embodiment of a method for operating a wind turbine.

Further, due to that the "no load" voltage, so called "back exciting magnetic force voltage", increases during cold temperature operation and the circuit breakers and IGBTs are limited in their ability to withstand voltage it may be insured, that the generator voltage, which depends on the temperature and the generator speed, stays below a maximum limit during every operation point. For example, the general voltage shown in the phasor diagrams FIG. 8 to FIG. 10 is the magnet wheel voltage $U_p$.

In a typical embodiment, if the magnet wheel voltage $U_p$ is higher than the voltage up to which the circuit breaker and/or the IBGTs have the ability to withstand in the event that the wind turbine is dropped from the grid, the generator voltage or magnet wheel voltage $U_p$ is applied to the circuit breakers and IGBTs, such that they may be destroyed. For example, in an embodiment, which may be combined with other embodiments herein, the magnet wheel voltage may be calculated using the temperature of the permanent magnets of the rotor. In a further embodiment, the magnet wheel voltage may be calculated based on the current going in the direction of the direct axis $I_{1d}$ and the rotational speed of the rotor of the generator, and in the case that the rotor includes an excitation winding, the current which is flowing in the excitation windings. In a further embodiment, the magnetic flux $\Psi_{PM}$ of the permanent magnets is reduced and the magnet wheel voltage $U_p$ is calculated from the magnetic flux of the permanent magnets.

Typically, in an embodiment, the generator is designed for a rated load condition, which also means that the temperature of the permanent magnet rotor is approximately 60 K above ambient temperature. During startup of the wind turbine at very low ambient temperature it can therefore be that during extreme overspeed of the turbine, the no load voltage, for example the magnet wheel voltage, can exceed the maximum limit of the breaker and converter hardware.

According to a typical embodiment, the temperature of the magnets by using information from the converter or a control device, allows control of the converter or the control device enabling it to trip the breaker between the converter and the grid, as soon as the control device or the converter detects a critical overspeed at a low temperature of the magnets.

In a typical embodiment, the converter or the control device controls the generator voltage to 690 Volt even above rated speed by use of reactive current that weakens the magnetic field inside the generator.

The higher the back electromagnetic force voltage is, the more reactive current is needed to reduce the generator voltage to a predetermined output voltage, for example 690 Volts.

For example, the output voltage or no load voltage without a load, for example the magnet wheel voltage $U_p$ is equal to the output voltage $U_S$, at a rated speed of the generator and warm magnets, is about 750 Volt. The no load voltage or output voltage which is equivalent to the generator voltage or the voltage of the magnetic wheel $U_p$, is about 825 Volt at the radius speed of the generator and cold magnets. Thus, if the generator is connected to the grid, the voltage may be reduced to 690 Volt. This is done using the reactive current. For example, in a typical embodiment, the current measured in direction of the direct axis d is lower for cold permanent magnets than for warm permanent magnets.

In a typical embodiment, which may be combined with other embodiments disclosed herein, the converter or the control device may detect the reactive current or current in direction of the d-axis or a current in the exciting windings of a rotor, and in the event that a speed value is sensed or detected that would increase the no load voltage to the allowed maximum voltage that can withstand the circuit breaker and/or the IGBTs of the converter, the control device of the generator may switch off the generator breaker before this value is reached. In particular, the wind rotor cannot be stopped immediately as it has a specific inertia. Further, according to a typical embodiment, which may be combined with other embodiments disclosed herein, the turbine does not need to follow a warm up procedure and therefore the annual energy production will be increased, in particular as the critical over speed limits are normally not reached during normal wind conditions. Further, according to an embodiment, which may be combined with other embodiments disclosed herein, the critical over speed limit may be set adaptively, dependent on the temperature of the permanent magnets.

In FIG. 10, a method for controlling the electrical system of a wind turbine is shown. In a first step 1000, the field weakening of the synchronous generator is determined. This, for example, may be performed by measuring the current in direction of the direct-axis d, by determining the magnetization of the permanent magnets, or by determining the temperature of the magnets. In a further embodiment, this may be performed bay measuring the current of the excitation windings.

In a step 1010 the rotor speed of the permanent magnets synchronous machine is determined. This, for example, may be performed by measuring the wind rotor speed, or by measuring the frequency of the output currents of the permanent synchronous generator. In a further step, the generator voltage or the magnet wheel voltage $U_p$ is determined in step 1020. In the event that the magnet wheel voltage $U_p$ exceeds a predetermined threshold value, which is checked in step 1030, a circuit breaker of the wind turbine is tripped in step 1040.

Further, no temperature sensing device at the permanent magnets is needed, as this information is deduced by other values, which can be easily measured. For example, a switch off of a converter and reactive current and temperature monitoring via voltage or current and rotational speed is possible. Hence, the voltage or current and the rotational speed may be used for temperature estimation and monitoring, in particular of the permanent magnets of the rotor of a permanent magnet machine.

According to an embodiment, a method for operating a wind turbine having an electrical system, the electrical system includes a permanent magnet generator having a rotor and a stator, and a power electronic device electrically connected to the permanent magnet generator, wherein the power electronic device and a circuit breaker are electrically disposed in series between the permanent magnet generator and a grid, wherein the permanent magnet generator has permanent magnets and a generator winding into which a voltage is induced by the permanent magnets when the rotor is rotating is provided, the method comprising: generating a signal for tripping the circuit breaker based on a field modification that is modifying the field of the permanent magnets of the permanent magnet generator.

In a further embodiment, which may be combined with other embodiments disclosed herein, the generating a signal for tripping the circuit breaker is further based on a rotational dynamic of the rotor of the permanent magnet generator.

In a typical embodiment, the field modification is a field modification in direction of the d-axis, in particular a field weakening, wherein the d-axis is an axis in direction of the magnetic field of the permanent magnets in a complex plane.

Typically, a field modification may reduce or increase the magnetic field of the permanent magnets. Thus, the combined magnetic field, in particular going in direction of the field of the magnetic field of the permanent magnets, of the permanent magnets and the field modification typically is smaller or greater than the magnetic field of the permanent magnets.

In an embodiment, the method may further include generating the signal for tripping the circuit breaker if the magnet wheel voltage exceeds a predetermined threshold voltage.

In a typical embodiment, which may be combined with other embodiments disclosed herein, the method further includes determining a magnet wheel voltage based on the field modification and the rotational dynamic of the rotor; and comparing the magnet wheel voltage to the predetermined threshold voltage.

According to an embodiment, which may be combined with other embodiments disclosed herein, the predetermined threshold voltage corresponds approximately to a maximum withstand capability voltage of the power electronic device.

In a further embodiment, which may be combined with other embodiments disclosed herein, the field modification is determined based on the determination of a value of $I_d$, wherein $I_d$ is the part of a current in the generator winding in direction of the d-axis, wherein the d-axis is an axis in direction of the magnetic field of the permanent magnets in a complex plane.

In another embodiment, the product of the of $I_d$ and the rotational speed of the rotor of the generator is compared with a predetermined threshold value, in particular for generating the signal for tripping the circuit breaker if the product exceeds the threshold value.

In a typical embodiment, which may be combined with other embodiments disclosed herein, the permanent magnet generator further includes at least one excitation winding arranged at at least one permanent magnet, wherein the at least one excitation winding is adapted for modification the magnetic field of the respective permanent magnet of the permanent magnet generator, wherein the field modification is determined based on the detection of a current in the at least one excitation winding and the detection of a value of $I_d$, wherein $I_d$ is the part of a current in the generator winding in direction of the d-axis, wherein the d-axis is an axis in direction of the magnetic field of the permanent magnets in a complex plane.

In a further embodiment, a temperature of the permanent magnets of the generator is determined based on a rotational dynamic of the rotor and the field modification.

In a typical embodiment, which may be combined with other embodiments disclosed herein, the power electronic device is selected from the group including an inverter, a commutator, a transformer, and a circuit breaker.

In a typical embodiment, a method for determining the temperature of at least one permanent magnet of a permanent magnet machine having a rotor and a stator is provided, wherein the permanent magnet machine has at least one permanent magnet and a machine winding into which a voltage is induced by the at least one permanent magnet when the rotor is rotated, the method comprising: determining the temperature of the at least one permanent magnet of the permanent magnet machine on the basis of a rotational dynamic of the rotor and the field modification that is modifying the field of the at least one permanent magnets of the permanent magnet machine.

According to a further aspect, a controller for a wind turbine is provided, the wind turbine comprising an electrical system having a permanent magnet generator having a rotor and a stator, and a power electronic device operatively connected to the permanent magnet generator, and a circuit breaker electrically disposed in series between the permanent magnet generator and a grid, wherein the permanent magnet generator has permanent magnets and a generator winding into which a voltage is induced by the permanent magnets when the rotor is rotating, wherein the controller is further adapted to be connected to a control circuit of the circuit breaker, wherein the controller is adapted to generate a signal for tripping the circuit breaker based on a field modification of the magnetic field of the permanent magnets of the permanent magnet generator.

In a typical embodiment, the controller is adapted to generate the signal for tripping further based on a rotational dynamic of the rotor of the permanent magnet generator, in particular by determining the rotational speed of the rotor.

According to a further embodiment, the controller is adapted to detect of a value of $I_d$, wherein $I_d$ is the part of a current in the generator winding in direction of the d-axis, wherein the d-axis is an axis in direction of the magnetic field of the permanent magnets in a complex plane.

In a further embodiment, the permanent magnet generator further includes at least one excitation winding arranged at at least one permanent magnet, wherein the at least one excitation winding is adapted for weakening the magnetic field of the respective permanent magnet of the generator, wherein the field modification is determined based on the detection of a current in the at least one excitation winding and the detection of a value of $I_d$, wherein $I_d$ is the part of a current in the generator winding in direction of the d-axis, wherein the d-axis is an axis in direction of the magnetic field of the permanent magnets in a complex plane.

According to a typical embodiment, the field modification may be a field weakening.

In a typical embodiment, the controller is adapted for determining a temperature of the permanent magnets of the permanent magnet generator on the basis of a measured rotor speed and the field modification.

In a typical embodiment, the power electronic device is selected from the group including an inverter, a commutator, a transformer, and a circuit breaker.

In a further embodiment, which may be combined with other embodiments disclosed herein, the permanent magnet generator of the wind turbine is a synchronous generator.

In a typical embodiment, the permanent magnets of the permanent magnet generator are disposed on the rotor.

This written description uses examples, including the best mode, to enable any person skilled in the art to make and use the described subject-matter. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine comprising an electrical system, the electrical system comprises a permanent magnet generator comprising a rotor and a stator, and a power electronic device electrically connected to the permanent magnet generator, wherein the power electronic device and a circuit breaker are electrically disposed in series between the permanent magnet generator and a grid, wherein the permanent magnet generator comprises permanent magnets and a generator winding into which a voltage is induced by the permanent magnets when the rotor is rotating, the method comprising:
generating a signal for tripping the circuit breaker based on a field modification that is modifying the field of the permanent magnets of the permanent magnet generator.

2. The method according to claim 1, wherein the generating a signal for tripping the circuit breaker is further based on a rotational dynamic of the rotor of the permanent magnet generator.

3. The method according to claim 1, wherein the field modification is a field modification in direction of a d-axis, wherein the d-axis is an axis in direction of the magnetic field of the permanent magnets in a complex plane.

4. The method according to claim 1, wherein the method further comprises generating the signal for tripping the circuit breaker if a magnet wheel voltage exceeds a predetermined threshold voltage.

5. The method according to claim 4, wherein the method further comprises determining the magnet wheel voltage based on the field modification and a rotational dynamic of the rotor; and comparing the magnet wheel voltage to the predetermined threshold voltage.

6. The method according to claim 4, wherein the predetermined threshold voltage corresponds approximately to a maximum withstand capability voltage of the power electronic device.

7. The method according to claim 1, wherein the field modification is determined based on the detection of a value of $I_d$, wherein $I_d$ is the part of a current in the generator winding in direction of a d-axis, wherein the d-axis is an axis in direction of the magnetic field of the permanent magnets in a complex plane.

8. The method according to claim 1, wherein the permanent magnet generator further comprises at least one excitation winding arranged at at least one of the permanent magnets, wherein the at least one excitation winding is configured to modify the magnetic field of the respective permanent magnet of the permanent magnet generator, wherein the field modification is determined based on the detection of a current in the at least one excitation winding and the detection of a value of $I_d$, wherein $I_d$ is the part of a current in the generator winding in direction of a d-axis, wherein the d-axis is an axis in direction of the magnetic field of the permanent magnets in a complex plane.

9. The method according to claim 1, wherein a temperature of the permanent magnets of the generator is determined based on a rotational dynamic of the rotor and the field modification.

10. The method according to claim 1, wherein the power electronic device is selected from the group including an inverter, a commutator, a transformer, and a circuit breaker.

11. A method for determining a temperature of at least one permanent magnet of a permanent magnet machine comprising a rotor and a stator, wherein the permanent magnet machine comprises at least one permanent magnet and a machine winding into which a voltage is induced by the at least one permanent magnet when the rotor is rotated, the method comprising:
determining the temperature of the at least one permanent magnet of the permanent magnet machine on the basis of a rotational dynamic of the rotor and a field modification that is modifying the field of the at least one permanent magnet of the permanent magnet machine.

12. The method according to claim 11, wherein the field modification is determined based on the detection of a value of $I_d$, wherein $I_d$ is the part of a current in the machine winding in direction of a d-axis, wherein the d-axis is an axis in direction of the magnetic field of the at least one permanent magnet in a complex plane.

13. The method according to claim 11, wherein the permanent magnet machine further comprises at least one excitation winding arranged at at least one of the permanent magnets, wherein the at least one excitation winding is configured to modify the field of the magnetic field of the respective permanent magnet of the permanent magnet machine, wherein the field modification is determined based on the detection of a current in the at least one excitation winding and the detection of a value of $I_d$, wherein $I_d$ is the part of a current in the machine winding in direction of a d-axis, wherein the d-axis is an axis in direction of the magnetic field of the at least one permanent magnet in a complex plane.

14. A controller for a wind turbine, the wind turbine comprising an electrical system comprising a permanent magnet generator comprising a rotor and a stator, and a power electronic device operatively connected to the permanent magnet generator, and a circuit breaker electrically disposed in series between the permanent magnet generator and a grid, wherein the permanent magnet generator comprises permanent magnets and a generator winding into which a voltage is induced by the permanent magnets when the rotor is rotating, wherein the controller is configured to be connected to a control circuit of the circuit breaker, wherein the controller is further configured to generate a signal for tripping the circuit breaker based on a field modification of the magnetic field of the permanent magnets of the permanent magnet generator.

15. The controller according to claim 14, wherein the controller is configured to generate the signal for tripping the circuit breaker further based on a rotational dynamic of the rotor of the permanent magnet generator.

16. The controller for a wind turbine according to claim 14, wherein the controller is configured to detect of a value of $I_d$, wherein $I_d$ is the part of a current in the generator winding in direction of a d-axis, wherein the d-axis is an axis in direction of the magnetic field of the permanent magnets in a complex plane.

17. The controller for a wind turbine according to claim 14, wherein the permanent magnet generator further comprises at least one excitation winding arranged at at least one of the permanent magnets, wherein the at least one excitation winding is configured to modify the magnetic field of the respective permanent magnet of the permanent magnet generator, wherein the field modification is determined based on the detection of a current in the at least one excitation winding and the detection of a value of $I_d$, wherein $I_d$ is the part of a current in the generator winding in direction of a d-axis, wherein the d-axis is an axis in direction of the magnetic field of the permanent magnets in a complex plane.

18. The controller for a wind turbine according to claim 14, wherein the controller is further configured to determine a temperature of the permanent magnets of the permanent magnet generator on the basis of a measured rotor speed and the field modification.

19. A wind turbine comprising a controller according to claim 14.

20. The wind turbine according to claim 19, wherein the power electronic device is selected from the group including an inverter, a commutator, a transformer, and a circuit breaker.

* * * * *